United States Patent
Kestner et al.

(10) Patent No.: US 8,641,346 B2
(45) Date of Patent: Feb. 4, 2014

(54) METAL TO METAL FASTENER IMPROVEMENT

(75) Inventors: Kyle Kestner, Schaumburg, IL (US); Anthony Caringella, Norridge, IL (US); Tomasz Sikora, River Grove, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 181 days.

(21) Appl. No.: 13/183,151

(22) Filed: Jul. 14, 2011

(65) Prior Publication Data

US 2013/0017038 A1    Jan. 17, 2013

(51) Int. Cl.
*F16B 15/06* (2006.01)

(52) U.S. Cl.
CPC ..................... *F16B 15/06* (2013.01)
USPC ............ 411/450; 411/476; 411/477

(58) Field of Classification Search
USPC .......... 411/450, 446–447, 451.3, 476, 477, 411/480, 482, 488–490, 508, 913
See application file for complete search history.

(56) References Cited

U.S. PATENT DOCUMENTS

| | | | | |
|---|---|---|---|---|
| 457,582 | A | * | 8/1891 | Goldie .......................... 411/489 |
| 2,077,120 | A | * | 4/1937 | Lombard ...................... 411/447 |
| 2,129,949 | A | * | 9/1938 | Lombard ...................... 411/446 |
| 2,143,605 | A | * | 1/1939 | Lombard ...................... 411/447 |
| 3,882,755 | A | * | 5/1975 | Enstrom ....................... 411/456 |
| 4,279,190 | A | * | 7/1981 | Hummel ....................... 411/487 |
| 5,158,258 | A | | 10/1992 | McFadzean |
| 6,905,299 | B2 | * | 6/2005 | Moores, Jr. ................... 411/478 |
| 2008/0089760 | A1 | * | 4/2008 | Yao .............................. 411/477 |
| 2009/0320328 | A1 | | 12/2009 | Gosis et al. |

FOREIGN PATENT DOCUMENTS

| | | |
|---|---|---|
| FR | 1197693 | 12/1959 |
| WO | 9203664 | 3/1992 |
| WO | 03001073 | 1/2003 |

OTHER PUBLICATIONS

European Patent Office, International Searching Authority, International Search Report and Written Opinion for PCT/US2012/046731, Date of mailing Nov. 7, 2012.

* cited by examiner

*Primary Examiner* — Fleming Saether
(74) *Attorney, Agent, or Firm* — Klintworth & Rozenblat IP LLC

(57) ABSTRACT

A cleat is provided. The cleat includes, but is not limited to, a head, a shank, and a vertical slot formed through the head and a portion of the shank. The shank is connected to the head and has a pair of opposing planar faces and a pair of opposing short edges, a wide portion and a point. The edges are provided with at least one serration fixed relative to said wide portion.

17 Claims, 3 Drawing Sheets

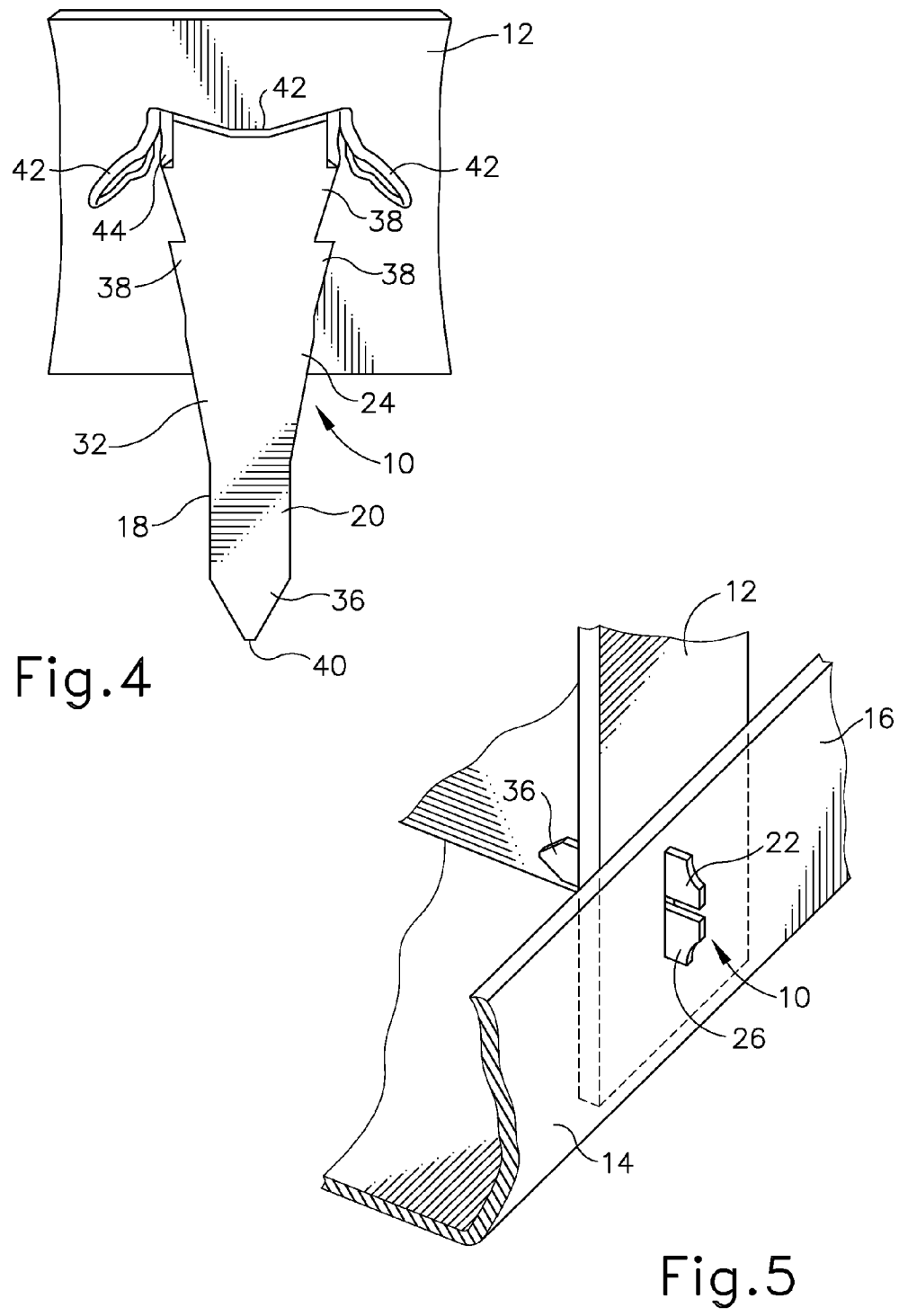

METAL TO METAL FASTENER IMPROVEMENT

FIELD OF THE INVENTION

The present invention relates to fasteners, and specifically, to fasteners used to connect light-gauge sheet metal in commercial construction.

BACKGROUND OF THE INVENTION

Light-gauge metal studs may be used to frame walls for commercial construction, particularly when framing interior, non-load bearing walls. When metal studs are used, generally U-shaped tracks are installed at the top and bottom of a wall attached respectively to upper and lower substrates, and C-shaped, vertically oriented studs are fit within the tracks at regular intervals. Fasteners such as self-tapping sheet metal screws are typically used to connect the metal studs to the tracks. Such screws require the use of a manual or powered screwdriver, and take longer to install when compared to other types of fasteners, such as nails or brads. Additionally, screws are typically carried in a small pouch worn at a user's belt. The user removes screws from the pouch one at a time as needed, further slowing down the installation process. In some cases, it may also be necessary to clamp the stud to the track to prevent the stud from bending or warping. This clamping still further slows the installation and framing process.

On the other hand, fasteners such as nails and brads are generally faster to install than screws, and can be loaded into magazines, which speeds the required installation time. However, nails and brads typically cannot securely fasten multiple pieces of sheet metal to one another. Also, the force used to drive nails and brads into the sheet metal tends to push the stud away from the track, forming an undesirable gap between the track and the stud.

Thus, there is a need for an improved fastener that addresses the drawbacks identified above.

SUMMARY

The present invention is defined by the following claims, and nothing in this section should be taken as a limitation on those claims.

In one aspect, a cleat is provided. The cleat includes, but is not limited to, a head, a shank, and a vertical slot formed through the head and a portion of the shank. The shank is connected to the head and has a pair of opposing planar faces and a pair of opposing short edges, a wide portion and a point. The edges are provided with at least one serration fixed relative to said wide portion.

In one aspect, a cleat for use with a powered fastener driver for securing metal studs to a metal guide track is provided. The cleat includes, but is not limited to, a head, a shank, and a vertical slot formed through the head and a portion of the shank. The shank is connected to the head and has a pair of opposing planar faces and a pair of opposing short edges. The head is connected to the shank by a breakaway joint.

In one aspect, a cleat for use with a powered fastener driver for securing metal studs to a metal guide track is provided. The cleat includes, but is not limited to, a head, a shank, and a vertical slot formed through the head and a portion of the shank. The shank is connected to the head and has a pair of opposing planar faces and a pair of opposing short edges, a wide portion and a point. The edges are provided with at least one serration dimensioned so that as said shank is driven to secure the stud to the guide track. Metal tabs are formed in the guide track and the serrations hold the cleat in place relative to the tabs to tack the track and the stud together.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 4 depicts a fragmentary top perspective view of the present cleat after being driven into adjoining portions of a stud and support track per FIG. 1; and FIG. 5 depicts a fragmentary top perspective view of the present fastener as depicted in FIG. 4.

DETAILED DESCRIPTION

Methods and devices consistent with the present invention overcome the disadvantages of conventional fasteners by using a cleat which has a vertical slot formed through a head and a portion of a shank of the cleat. By forming a vertical slot through the head and a portion of the shank of the cleat, the cleat may be used to join a first substrate to a second substrate with improved pullout force. As the cleat is inserted through the first and second substrates, the vertical slot will compress. The compression of the vertical slot causes a tension force between the cleat and the substrates. The added tension helps to hold the cleat in the substrates and improves the pullout value of the cleat, requiring additional force in order to pull-out the cleat.

Figure 1:
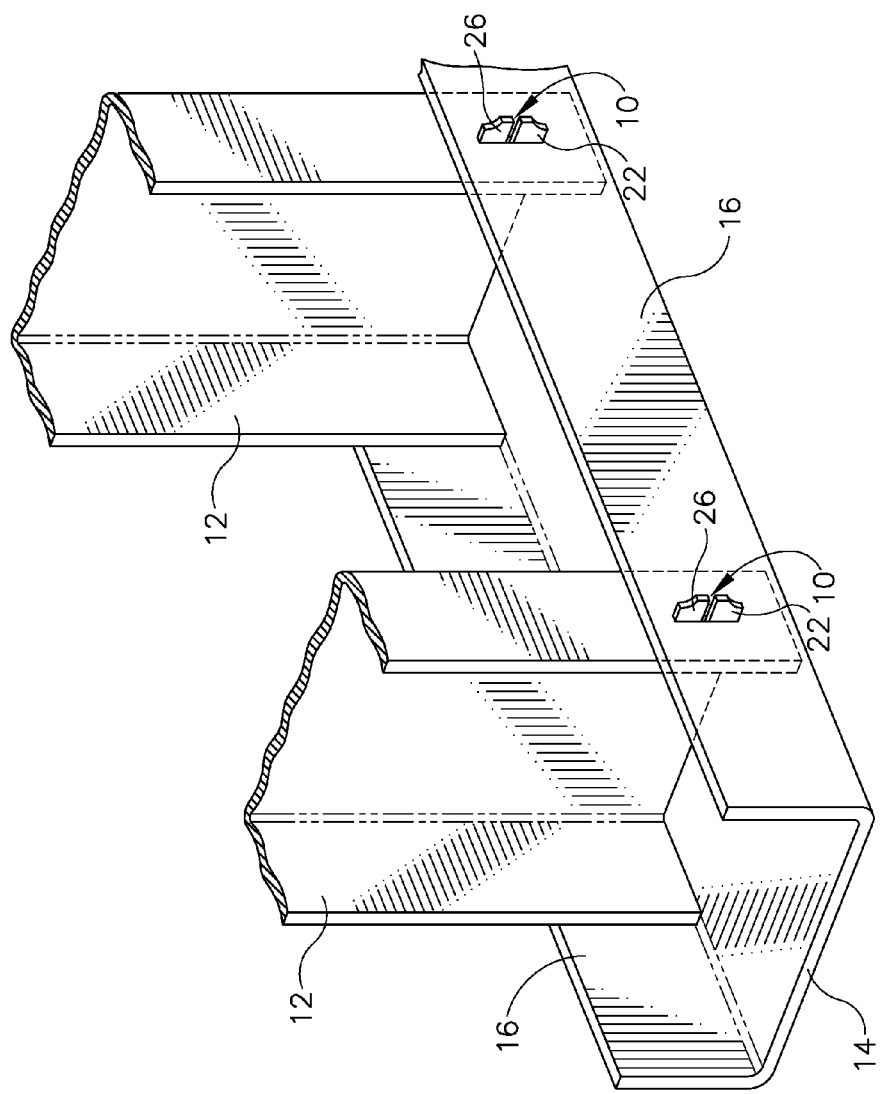
FIG. 1 depicts a fragmentary top perspective view of studs connected to a guide track using the present cleat.

Referring now to FIGS. 1 and 5, the present cleat, generally designated 10 is a fastener preferably used to join a first substrate to a second substrate. Substrates to be joined together may include various members used in construction, including drywall, wood, fiberglass, and pieces of light-gauge sheet metal, such as that used in forming a metal stud 12 and a track 14 for wall framing. Each stud 12 is inserted between two upright walls 16 of the track 14. The cleat 10 may be driven through one upright wall 16 of the track 14 and the stud 12, and helps to prevent the stud from moving relative to the track.

Figure 3:
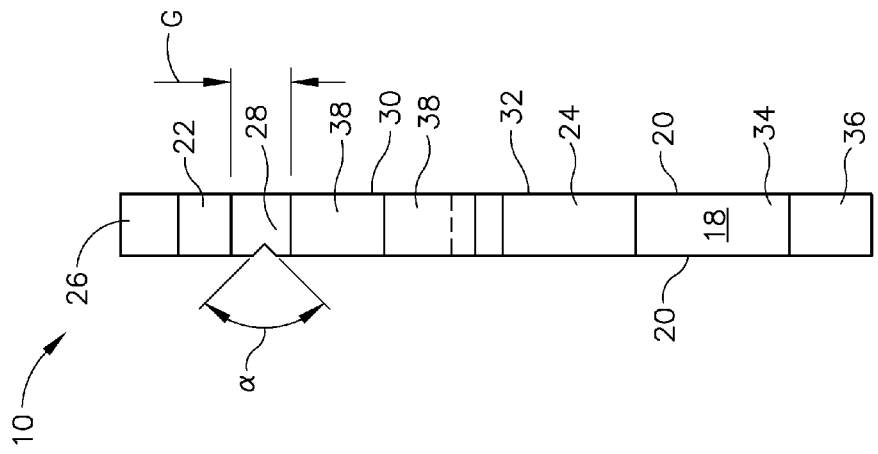
FIG. 3 depicts a side view of the cleat of FIG. 2.
Figure 2:
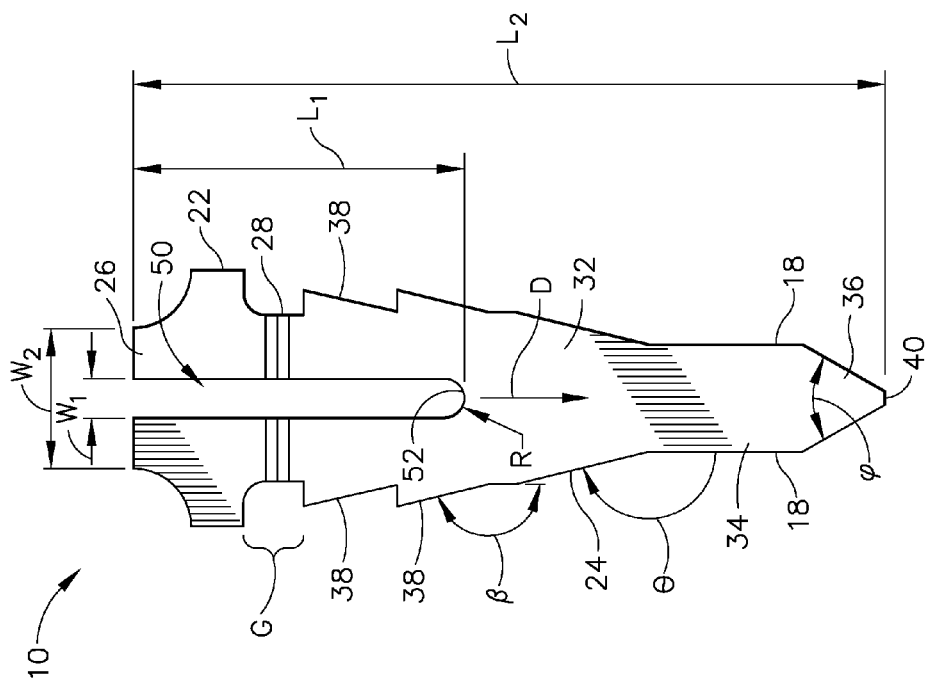
FIG. 2 depicts a front view of the present cleat.

As shown in FIGS. 2 and 3, the cleat 10 is relatively flat or planar, and is preferably formed using light-gauge sheet metal, which is approximately 0.062 inches thick. Thus, the cleat 10 has two opposing short edges 18, which have a height of approximately 0.06 inches and two opposing planar faces 20. The edges 18 and faces 20 give the cleat 10 a generally rectangular cross-section. Each of the cleats 10 is approximately 0.7 to 0.8 inches long and approximately 0.25 to 0.28 inches wide, at the widest part. Cleats 10 are preferably formed from 16 gauge sheet of metal by stamping, laser cutting, or water jet cutting, although different sheet metal thicknesses, dimensions and production techniques are contemplated depending on the application.

The cleat 10 has a removable head 22 and a shank 24. The head 22 of the cleat 10 is the widest portion of the fastener, having a preferred width of approximately 0.25 to 0.28 inches. It is also preferred the head 22 has a low profile, accounting for less than 20% of the overall length of the cleat 10. Preferably, the head 22 extends laterally approximately 0.0475 inches beyond each lateral edge of the shank 24. This relatively low profile allows drywall to be placed over the head 22 without showing a noticeable bulge where the drywall contacts the fastener head. The head 22 also optionally includes a tab 26 that provides additional surface area for a user to grip the cleat 10 after the cleat has been driven into the track 14 and the stud 12.

Referring now to FIG. 3, a breakaway joint 28 connects the removable head 22 to the shank 24 and allows for easy removal of the cleat. The breakaway joint 28 is preferably formed from a beveled notch located at least on one of the planar faces 20 where the head 22 meets the shank 24. The notch forms an angle a of approximately 57° to 63°, although other angles are contemplated. To remove the cleat 10 from the metal track 14 and stud 12, a user grips the removable head 22 with a pair of pliers or the like, and rotates the head relative to the shank 24. This rotation causes the removable head 22 to break off from the shank 24 at the breakaway joint 28, allowing the user to dispose of the head, and allowing the shank to fall away. The joint 28 also defines a gap "G" between the head 22 and the shank 24 that is large enough to accommodate two layers of light-gauge metal. The defined gap "G" is preferably about 0.06 to 0.07 inches, but any thickness sufficient to accommodate the two layers of sheet metal is acceptable.

The shank 24 of the cleat 10 is preferably unitary and is generally stepped, having a wide portion 30, a tapered portion 32, a narrow portion 34, and a point 36, each of the above disposed in sequential order and being fixed relative to each other. The above-described rectangular cross-section of the shank is particularly noticeable at the wide portion 30. In addition, the wide portion 30 is adjacent to the breakaway joint 28 and has a width of approximately 0.170 inches. Serrations 38 are preferably formed along at least a portion of the edges 18 of the wide portion 30. Typically, two serrations 38 are formed on each edge 18, and each serration is approximately 0.100 inches long and extends outwardly approximately 0.025 inches from the edge of the wide portion 30. Each of the serrations 38 forms an angle β of approximately 164° to 168° with respect to the corresponding edge 18. However, different serration measurements and/or more serrations are contemplated.

The tapered portion 32 of the shank 24 is disposed between the wide portion 30 and the narrow portion 34. In the preferred embodiment, the width of the tapered portion 32 narrows constantly from approximately 0.170 inches adjacent to the wide portion 30 to approximately 0.100 inches adjacent to the narrow portion 32. Each of the edges 18 of the tapered portion 32 forms an angle θ of approximately 153° to 157° with respect to the corresponding edge 18 of the narrow portion 34. As stated above, it is contemplated that these dimensions and angles may vary with the application.

The narrow portion 34 of the cleat 10 is adjacent to the tapered portion 32. The narrow portion 34 has a width of approximately 0.080 to 0.125 inches, and is preferably approximately 0.100 inches wide. The edges 18 of the narrow portion 34 are preferably smooth.

Referring now to FIG. 3, a vertical slot 50 is formed through the head 22 and into the shank 24 of the cleat 10. Vertical slot 50 is formed in a direction D from the tab 26 towards the tip 40, dividing the head 22 into two portions and going through at least a portion of the shank 24. Preferably, the vertical slot 50 has a length $L_1$ from 0.20 to 0.80 inches, and more preferably from 0.25 to 0.50 inches, and most preferably about 0.375 inches, ±0.125 inches. In one embodiment, the vertical slot 50 has a length $L_1$ which is from 25% to 75% a length $L_2$ of cleat 10 from the head 22 to the tip 40, and more preferably, from 40% to 55% the length $L_2$ of cleat 10, and more preferably less than 50% the length $L_2$ of the cleat 10, and most preferably about 46.875%±5%. Preferably, the vertical slot 50 has a width $W_1$ from 0.01 to 0.05 inches, and more preferably from 0.025 to 0.040 inches, and most preferably about 0.03 inches, ±0.01 inches. Preferably, the vertical slot 50 has width $W_1$ from 5% to 20% the maximum width $W_2$ of the cleat 10. Preferably, a bottom end 52 of the vertical slot 50 formed in the shank 24 is preferably radiused. The radius of curvature provided for the bottom end 52 is approximately 0.010 inches, ±0.005 inches. While a radiused bottom end 52 is preferable, it is also contemplated that the bottom end 52 is angular. As stated above, it is contemplated that these dimensions and angles may vary with the application.

The vertical slot 50 compresses as the cleat 10 enters a substrate and wedges itself into the substrate. The compression of the vertical slot 50 causes a tension force between the cleat 10 and the substrate. The added tension helps to hold the cleat 10 in the substrate and improves the pullout value of the cleat 10, requiring additional force in order to pullout the cleat 10. Due to the geometry of the cleat 10, the cleat 10 pushes a portion of the first substrate through the second substrate and then locks a portion of material from the second substrate on one of the serrations 38 of the cleat 10. When this happens, the connection between the two substrates becomes strong, requiring about 100 lbs., or more, of force to break the connection between the two substrates.

The point 36 of the shank 24 is located adjacent to the narrow portion 34, and furthest from the head 22. The point 36 has a width that tapers uniformly from approximately 0.075 to 0.125 inches adjacent to the narrow portion 34 to a tip 40 furthest away from the narrow portion. The edges 18 of the point 36 form an angle φ of approximately 57° to 63° with respect to one another. The tip 40 of the point 36 must be sharp enough to pierce through light gauge sheet metal when a sufficient amount of force is provided. However, many manufacturing methods do not allow for a sharp tip. Thus, the tip 40 is preferably radiused. The radius of curvature provided for the tip 40 is approximately 0.010 inches. While a radiused tip is preferable, it is also contemplated that the tip is angular. As stated above, it is contemplated that these dimensions and angles may vary with the application.

The cleats 10 are collated into strips of 50 or 100 units using a known collation method such as glue, paper, or the like. The collated cleats 10 can then be loaded into a fastener driver tool for rapid sequential installation. The cleats 10 can be driven into light-gauge metal such as that used in the track 14 and stud 12, and the amount of force applied by the fastener driver is sufficient to alleviate bending and warping that could occur when using hand tools such as a hammer.

In operation, a fastener driver holding the cleats 10 is placed in contact with the upright wall 16 of the metal guide track 14 that holds a metal framing stud 12. When a cleat 10 is fired into the track 14 and stud 12, the point 36 penetrates both layers of sheet metal. As shown in FIGS. 4-5, the shape of the edges 16 causes the metal to tear into individual tabs, including stud tabs 42 and track tabs 44. Then the geometry of the stepped shank 24 forces the track tabs 44 tom from the upright wall 16 of the guide track 14 to push through the metal stud 12. The serrations 38 on the wide portion 30 of the shank 24 act as a tacking mechanism, holding the cleat 10 in place relative to the tabs 42, 44 that were formed. The tacking mechanism provided by the serrations 38 increases the force required to push a cleat 10 out of the stud, such that the average push out force is about 100 pounds.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A cleat comprising:
   a head;
   a shank connected to said head, having a pair of opposing planar faces and a pair of opposing short edges, a wide portion and a point;
   said edges are provided with at least one serration fixed relative to said wide portion; and
   a vertical slot formed through the head and a portion of the shank, wherein the vertical slot has a length $L_1$ that is from about 25% to about 75% of a length $L_2$ of said cleat when measured from the head to a tip of the shank.

2. The cleat of claim 1 further including at least a pair of serrations on each said edge, said serrations extending wider progressing toward said head.

3. The cleat of claim 1 wherein said head is wider than any point on said shank.

4. The cleat of claim 1 wherein said head accounts for approximately less than 20% of a total length of said cleat.

5. The cleat of claim 1 further including a breakaway joint located between said head and said shank configured for facilitating detachment of said head from said shank and removal of said cleat once driven.

6. The cleat of claim 1 further including a gap in each said edge formed between said head and said at least one serration, said gap dimensioned to accommodate thicknesses of a stud and a track.

7. The cleat of claim 1 further including a tapered portion between said wide portion and said point, wherein said tapered portion is formed by said edges tapering uniformly to form an angle of approximately 50 degrees with respect to one another.

8. The cleat of claim 1, wherein the vertical slot has a width from 0.01 to 0.05 inches.

9. A cleat for use with a powered fastener driver for securing metal studs to a metal guide track, said cleat comprising:
   a head;
   a shank connected to said head, having a pair of opposing planar faces and a pair of opposing short edges, wherein said head is connected to said shank by a breakaway joint; and a vertical slot formed through the head and a portion of the shank; and
   wherein the vertical slot has a length $L_1$ that is from 25% to 75% of a length $L_2$ of said cleat when measured from the head to a tip of the shank.

10. The cleat of claim 9 wherein said shank includes a wide portion, a tapered portion and a point, and at least one serration extending from each said edge.

11. The cleat of claim 9 wherein said breakaway joint is formed by a notch.

12. The cleat of claim 9 wherein said cleat defines a gap in said edges between said head and at least one serration, said gap configured for accommodating thicknesses of a metal stud and a guide track.

13. The cleat of claim 9 further including a wide portion, a point, and a tapered portion between said wide portion and said point, wherein said tapered portion is formed by said edges tapering uniformly to form an angle of approximately 50 degrees with respect to one another.

14. The cleat of claim 9, wherein the vertical slot has a width from 0.01 to 0.05 inches.

15. A cleat for use with a powered fastener driver for securing metal studs to a metal guide track, said cleat comprising:
   a head;
   a shank connected to said head, having a pair of opposing planar faces and a pair of opposing short edges, a wide portion and a point, wherein said edges are provided with at least one serration dimensioned so that as said shank is driven to secure the stud to the guide track, metal tabs are formed in the guide track, and said serrations hold the cleat in place relative to the tabs to tack the track and the stud together;
   a gap in each of said edges formed between said head and said at least one serration, said gap dimensioned to accommodate thicknesses of a stud and a track; and
   a vertical slot formed through the head and a portion of the shank; and
   wherein the vertical slot has a length $L_1$ that is from 25% to 75% of a length $L_2$ of said cleat when measured from the head to a tip of the shank.

16. The cleat of claim 15 wherein said at least one serration forms an angle of approximately 164 degrees to 168 degrees with respect to said corresponding edge.

17. The cleat of claim 15 further including a tapered portion between said wide portion and said point, wherein said tapered portion is formed by said edges tapering uniformly to form an angle of approximately 50 degrees with respect to one another.

* * * * *